United States Patent
Chawala

(10) Patent No.: US 9,851,228 B1
(45) Date of Patent: Dec. 26, 2017

(54) FLUID GAUGING DEVICE

(71) Applicant: Sahil Chawala, Nagpur (IN)

(72) Inventor: Sahil Chawala, Nagpur (IN)

(73) Assignee: Sahil Chawala, Nagpur (IN)

( * ) Notice: Subject to any disclaimer, the term of this patent is extended or adjusted under 35 U.S.C. 154(b) by 0 days.

(21) Appl. No.: 15/422,482

(22) Filed: Feb. 2, 2017

(51) Int. Cl.
| | | |
|---|---|---|
| G01F 1/00 | (2006.01) | |
| G01F 1/05 | (2006.01) | |
| G06Q 30/02 | (2012.01) | |
| G08C 17/02 | (2006.01) | |
| G01S 19/03 | (2010.01) | |
| H04W 4/00 | (2009.01) | |
| G08B 5/36 | (2006.01) | |

(52) U.S. Cl.
CPC ........... *G01F 1/05* (2013.01); *G06Q 30/0206* (2013.01); *G08C 17/02* (2013.01); *G01S 19/03* (2013.01); *G08B 5/36* (2013.01); *H04W 4/008* (2013.01)

(58) Field of Classification Search
CPC ..... G01F 1/84; G01M 3/04; C02F 5/00; B01J 49/00
See application file for complete search history.

(56) References Cited

U.S. PATENT DOCUMENTS

| | | | | |
|---|---|---|---|---|
| 4,096,706 A | * | 6/1978 | Beckwith | ................. F25B 1/00 62/115 |
| 4,237,538 A | * | 12/1980 | Le Dall | .................... B01J 49/85 210/138 |
| 8,020,430 B2 | * | 9/2011 | Farnsworth | ............. G01M 3/26 73/40.5 R |
| 2005/0109703 A1 | * | 5/2005 | Newenhizen | .......... B01D 61/08 210/739 |
| 2015/0153210 A1 | * | 6/2015 | Bartlett | .................... B67D 7/16 141/95 |

* cited by examiner

*Primary Examiner* — Jewel V Thompson

(57) ABSTRACT

A fluid gauging system for gauging a fluid includes a flow measuring device, an air sealing arrangement, and an electronic circuit. The flow measuring device includes a flow sensor that measures a flow rate of the fluid. The air sealing arrangement seals an inlet of the flow measuring device against an entry of atmospheric air. The electronic circuit includes a processor, a GPS module, and a communication module. The processor generates a data signal based on the flow rate. The GPS module provides a real time location of the flow measuring device. The communication module transmits the data signal and real time location to a remote server. A user device includes a software application that receives the data signal from the remote server and generates reports and statistics. Further, the processor notifies the user device if the flow measuring device is disconnected from the electronic circuit.

14 Claims, 8 Drawing Sheets

FLUID GAUGING DEVICE

BACKGROUND

Field of the Invention

The present invention relates generally to a system and a method for monitoring an amount of fluid dispensed from a fluid inventory, and, more particularly, to a system and a method for monitoring pilfering of the fluid and report such pilfering to a user.

Description of the Related Art

Theft of fluids, such as fuels, oils, paints, and the like is major problem at most of the commercial places, such as petrol pumps, gas stations, kerosene depots, grocery shops, diesel generator sites, etc. Most of the petrol pumps tamper their fuel dispenser machines, such that the fuel dispenser machines display an amount of the fuel manually entered by an attendant, however, the amount of the fuel filled in a fuel tank of a vehicle is less than the amount of the fuel displayed on the fuel dispenser machine. Due to such a pilferage of the fuel, the owner of the vehicle has to pay more money in exchange for a less amount of the fuel. Similarly, for other application which involves dispensing the fluid by a fluid dispensing machine or by the attendant, it is difficult to monitor whether the fluid dispensing machine or the attendant has provided the exact amount of fluid.

Diesel generator owners face similar problems. They have to fill diesel in the generators at regular intervals. The diesel is stored in a fuel source tank which is generally kept above the generator. An inlet pipe is connected to the fuel source tank that provides the diesel to the generator. The attendant has to suck the air from the inlet pipe in order to the fill the diesel in the generator. However, the fuel would be harmful to the attendant using this method. Since the method is manually performed by the attendant, it is difficult to monitor the amount of the fuel filled in the diesel generator.

A known technique to overcome the aforementioned problems is to use a system that monitors a flow rate of the fluid and calculates the amount of fluid based on the flow rate. Generally, the system includes a flow sensor and a processor. The flow sensor is a helical gear meter or a magnetized propeller that measures the flow rate of the fluid being filled. The processor determines the amount of fluid based on the flow rate. However, the helical gear meter requires a sealed chamber for its operation which increases design complexity of the system. Further, the helical gear meter has a drawback of fluid slippage that introduces an error in the flow rate measurement. The magnetized propeller operates accurately with a conducting medium. However, the magnetized propeller cannot be used with hydrocarbons such as oil, petrol, diesel, and the like. Further, when such system is used with diesel generators, the accuracy of the system depends on the height at which the fuel source tank is kept above the ground.

Another known technique is to use a level sensor in the fuel tank to measure the amount of fluid dispensed. The level sensor measures a level of the fluid and the processor calculates the amount of fluid based on the level of the fluid. However, disturbances in the fuel tank, incorrect placement of the level sensor in the fuel tank, and the like results in an incorrect measurement of the level of the fluid, thereby resulting in inaccurate measurement of the amount of fluid. Further, the level sensors are expensive and are not always affordable to a common man.

In light of the foregoing, there exists a need for a system that is inexpensive, that accurately measures the amount of fluid irrespective of its type to prevent pilferage of the fluid, and that enables the user to keep track of usage of the fluid.

SUMMARY OF THE INVENTION

An object of the present invention is to provide a system and a method that accurately measure the amount of fluid irrespective of its type.

Another object of the present invention is to provide a user with statistics and report to track usage of the fluid.

Additional objects of invention will become apparent from the ensuing specification and attached drawings.

In one embodiment of the present invention, a fluid gauging system is provided. The fluid gauging system includes a flow measuring device, an air sealing arrangement, and an electronic circuit. The flow measuring device has an inlet that is coupled to a fluid source tank to receive a fluid, and an outlet that is coupled to a storage tank that stores the fluid. The flow measuring device measures an amount of fluid flowing through the flow measuring device. The flow measuring device includes a flow sensor that measures a flow rate of the fluid flowing through the flow measuring device. The flow sensor generates an electrical signal that is proportional to the flow rate of the fluid. The air sealing arrangement is provided at the inlet of the flow measuring device and receives the fluid. The air sealing arrangement seals the inlet of the flow measuring device against an entry of atmospheric air, which creates vacuum inside the flow measuring device. The electronic circuit includes a processor, a memory, and a communication module. The processor is connected to the flow sensor and receives the electrical signal. Further, the processor processes the electrical signal and generates a data signal which is indicative of the flow rate of the fluid. The memory is connected to the processor and stores the data signal. The communication module is connected to the processor and receives the data signal. The communication module transmits the data signal to at least one of a remote server and a user device.

In another embodiment of the present invention, a method for gauging a fluid is provided. Using the method, a user can measure an amount of fluid transferred from a fluid source tank in to a storage tank based on a flow rate of the fluid. Further, data corresponding to the amount of fluid is transferred to at least one of a user device and a remote server. A location of a flow measuring device is determined by a global positioning system (GPS) module. It is determined whether the flow measuring device is connected to a processor and a power supply based on a logic state of a live signal through a live wire. A sensor connected notification to at least one of the user device and the remote server is transmitted using a communication module when the logic state of the live signal is indicative of an electrical connection between the flow measuring device, the processor, and the power supply. The fluid is received at an inlet of the flow measuring device from the fluid source tank, and an electrical signal which is proportional to the flow rate of the fluid is generated by the flow measuring device. The electrical signal is processed and a data signal is generated by the processor based on the processed electrical signal. The data signal and the location of the flow measuring device are transmitted to at least one of the remote server and the user device using the communication module. Further, various statistics are generated based on the data signal by at least one of the remote server and the user device.

Various embodiments of the present invention provide a fluid gauging system. The fluid gauging system includes a flow measuring device, an air sealing arrangement, and an electronic circuit. The flow measuring device has an inlet that is coupled to a fluid source tank by way of the air sealing arrangement to receive a fluid. Further, the flow measuring device has an outlet that is coupled to a storage tank that stores the fluid. The air sealing arrangement seals the inlet of the flow measuring device against an entry of atmospheric air which creates vacuum inside the flow measuring device. A flow sensor measures a flow rate of the fluid and generates an electrical signal based on the flow rate of the fluid. The electronic circuit includes a processor that receives and processes the electrical signal and generates a data signal. The electronic circuit further includes a communication module that transmits the data signal to at least one of a user device and a remote server. The electronic circuit further includes a global positioning system (GPS) module that provides a real time location of the flow measuring device to the processor. Further, the processor determines whether the flow measuring device is connected to the electronic circuit after a predetermined time interval using a live wire. The fluid gauging system further includes a debugging module connected to the processor to receive an error signal. The debugging module debugs the error signal and displays an error in the fluid gauging system based on the error signal.

The fluid gauging system uses the air sealing arrangement which enables an accurate measurement of the flow rate of fluid by the flow sensor, irrespective of the type of fluid. Generally, the fluid gauging system implements an air suction arrangement as the air sealing arrangement in a diesel generator application to draw the fluid from the fluid source tank. Since the air suction arrangement automatically draws the fluid, the fluid gauging system provides a safe option without causing any harm to an attendant. Further, the fluid gauging system notifies the remote server and the user device when the flow measuring device is disconnected from the electronic circuit. Furthermore, the remote server and the user device provide previous records of data corresponding to the data signal along with a corresponding real time location which can be exported in the form of PDF and Excel files, thereby enabling the attendant to track the usage of the fluid.

BRIEF DESCRIPTION OF THE DRAWINGS

The invention is described in detail below with reference to the drawings and examples. Such discussion is for purposes of illustration only. Modifications within the spirit and scope of the present invention, set forth in the appended claims, will be readily apparent to one of skill in the art. Terminology used throughout the specification and claims herein is given its ordinary meaning except as more specifically defined:

DETAILED DESCRIPTION OF THE INVENTION

As used in the specification and claims, the singular forms "a", "an" and "the" include plural references unless the context clearly dictates otherwise. For example, the term "an article" may include a plurality of articles unless the context clearly dictates otherwise.

There may be additional components described in the foregoing application that are not depicted on one of the described drawings. In the event such a component is described, but not depicted in a drawing, the absence of such a drawing should not be considered as an omission of such a design from the specification.

Before describing the present invention in detail, it should be observed that the present invention constitutes a fluid gauging device. Accordingly, the components have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
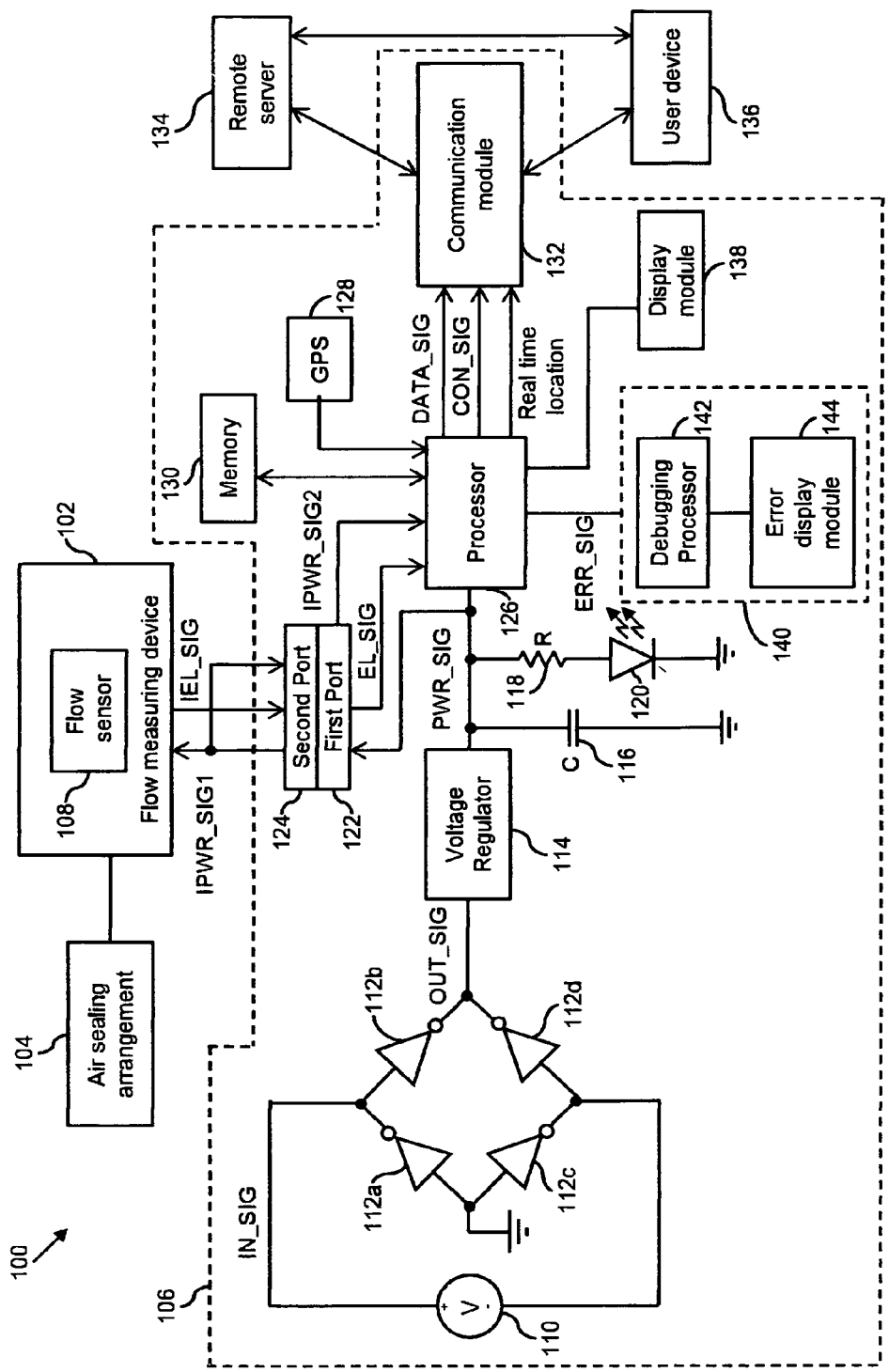
FIG. 1 is a schematic block diagram of a fluid gauging system, in accordance with an embodiment of the present invention.

Referring now to FIG. 1, a schematic block diagram of a fluid gauging system 100, in accordance with an embodiment of the present invention is shown. The fluid gauging system 100 is typically used to measure an amount of a fluid, such as fuels, oils, paints, water, and the like. The fluid gauging system 100 includes a flow measuring device 102, an air sealing arrangement 104, and an electronic circuit 106.

The flow measuring device 102 has an inlet that is coupled to a fluid source tank (not shown) to receive the fluid, and an outlet that is coupled to a storage tank (not shown) to store the fluid. The flow measuring device 102 includes a flow sensor 108 that measures a flow rate of the fluid flowing through the flow measuring device 102. The flow sensor 108 generates an intermediate electrical signal IEL_SIG that is proportional to the flow rate of the fluid. In a presently preferred embodiment, the flow sensor 108 is a turbine flow sensor. It will be understood by those skilled in the art that the fluid gauging system 100 is not restricted to use of the turbine flow sensor. The fluid gauging system 100 may include any other flow sensor except a helical gear meter or a magnetized propeller. Further, the fluid gauging system 100 can be manually calibrated to measure amount of various types of fluids such as fuels, oils, paints, water, and the like.

The air sealing arrangement 104 is provided at the inlet of the flow measuring device 102. The air sealing arrangement 104 seals the inlet of the flow measuring device 102 against an entry of atmospheric air. Further, the air sealing arrangement 104 creates vacuum inside the flow measuring device 102 for accurate measurement of the flow rate of the fluid.

The electronic circuit 106 includes a voltage supply 110, first through fourth diodes 112a-112d, a voltage regulator 114, a filter capacitor 116, a resistor 118, a light-emitting diode (LED) 120, first and second ports 122 and 124, a processor 126, a global positioning system (GPS) module 128, a memory 130, and a communication module 132. The electronic circuit 106 is enclosed in a case made from metal or plastic materials. In one embodiment, the first through fourth diodes 112a-112d, the voltage regulator 114, the filter capacitor 116, the resistor 118, the LED 120, the processor 126, the GPS module 128, the memory 130, and the communication module 132 are integrated on a single printed circuit board (PCB) to reduce overall size of the electronic circuit 106.

The first through fourth diodes 112a-112d are connected to form a bridge rectifier. The bridge rectifier receives an input signal IN_SIG from the voltage supply 110 and generates an output signal OUT_SIG. In one embodiment, the voltage supply 110 is a direct current (DC) supply that generates a DC input signal IN_SIG, and the bridge rectifier outputs a DC output signal OUT_SIG irrespective of the polarity of the voltage supply 110. In another embodiment, the voltage supply 110 is an AC supply that generates an AC input signal IN_SIG, and the bridge rectifier outputs the DC output signal OUT_SIG. In yet another embodiment, the voltage supply 110 includes rechargeable batteries that power the fluid gauging system 100.

The voltage regulator 114 has an input terminal that is connected to the bridge rectifier to receive the output signal OUT_SIG, and an output terminal that outputs a power signal PWR_SIG. The power signal PWR_SIG is a regulated version of the output signal OUT_SIG that powers the fluid gauging system 100.

The filter capacitor 116 is connected between the output terminal of the voltage regulator 114 and ground. A first terminal of the LED 120 is connected to the output terminal of the voltage regulator 114 by way of the resistor 118 and a second terminal of the LED 120 is connected to ground. An ON state of the LED 120 indicates presence of the voltage supply 110 in the fluid gauging system 100.

The flow measuring device 102 is connected to the processor 126 by way of the first and second ports 122 and 124. A first power supply wire is connected between the voltage regulator 114 and a first terminal of the first port 122. The first power supply wire receives and provides the power signal PWR_SIG to the first terminal of the first port 122.

A second power supply wire is connected between the flow sensor 108 and a first terminal of the second port 124. The second power supply wire provides the power signal PWR_SIG as a first intermediate power signal IPWR_SIG1 to the flow sensor 108 when the first terminal of the first port 122 is connected to the first terminal of the second port 124, thereby powering the flow sensor 108.

A first live wire is connected between the second power supply wire and a second terminal of the second port 124. The first live wire receives the first intermediate power signal IPWR_SIG1 and provides the first intermediate power signal IPWR_SIG1 to the second terminal of the second port 124.

A second live wire is connected between the processor 126 and a second terminal of the first port 122. The second live wire receives the first intermediate power signal IPWR_SIG1 as a second intermediate power signal IPWR_SIG2 and provides the second intermediate power signal IPWR_SIG2 to the processor 126.

A first data wire is connected between the flow sensor 108 and a third terminal of the second port 124 to receive the intermediate electrical signal IEL_SIG. A second data wire is connected between the processor 126 and a third terminal of the first port 122. The second data wire receives the intermediate electrical signal IEL_SIG and provides the intermediate electrical signal IEL_SIG as an electrical signal EL_SIG to the processor 126 when the third terminals of the first and second ports 122 and 124 are connected to each other.

The processor 126 is connected to the voltage regulator 114 to receive the power signal PWR_SIG. Further, the processor 126 processes the electrical signal EL_SIG and generates a data signal DATA_SIG. The processor 126 determines a logic state of the second intermediate power signal IPWR_SIG2 and generates a connection signal CON_SIG. The processor 126 activates the connection signal CON_SIG when the second intermediate power signal IPWR_SIG2 is at a first logic state and deactivates the connection signal CON_SIG when the second intermediate power signal IPWR_SIG2 is at a second logic state. In an embodiment, the first logic state is a logic HIGH state and the second logic state is a logic LOW state. The first logic state of the second intermediate power signal IPWR_SIG2 indicates an electrical connection between the flow sensor 108 and the electronic circuit 106. The second logic state of the second intermediate power signal IPWR_SIG2 indicates an electrical disconnection between the flow sensor 108 and the electronic circuit 106. The processor 126 further generates an error signal ERR_SIG that is indicative on an error in the fluid gauging system 100.

The GPS module 128 is connected to the processor 126 to establish a real time location of the fluid gauging system 100, more specifically the flow measuring device 102. The memory 130 is connected to the processor 126 to receive and store the data signal DATA_SIG and the real time location.

The communication module 132 is connected to the processor 126 to receive the data signal DATA_SIG, the connection signal CON_SIG, and the real time location. Further, the communication module 132 transmits at least one of the data signal DATA_SIG, the connection signal CON_SIG, and the real time location of the flow measuring device 102 to a remote server 134 or a user device 136. In one embodiment, the data signal DATA_SIG corresponds to the flow rate of the fluid. The user device 136 or the remote server 134 receives the data signal DATA_SIG and calculate the amount of fluid and a cost estimate based on the data signal DATA_SIG. In another embodiment, the data signal DATA_SIG corresponds to the flow rate and amount of fluid passed through the flow measuring device 102. The user device 136 or the remote server 134 receives the data signal DATA_SIG and calculates the cost estimate based on the data signal DATA_SIG. In yet another embodiment, the data signal DATA_SIG corresponds to the amount of fluid, the flow rate of the fluid, and the cost estimate of the fluid. The user device 136 or the remote server 134 receives the data signal DATA_SIG and displays the amount, flow rate, and cost estimate of the fluid.

In one embodiment, the processor 126 directs the communication module 132 to transmit a power disconnected signal to the remote server 134 or the user device 136 when the voltage supply 110 is disconnected from the fluid gauging system 100.

In one embodiment, the communication module 132 is a global system for mobile (GSM) module that receives the data signal DATA_SIG from the processor 126 and the real time location, and uploads data corresponding to the data signal DATA_SIG and the real time location to the remote server 134. Further, the GSM module sends a sensor connected notification to the remote server 134 or the user device 136 when the connection signal CON_SIG is activated and sends a sensor disconnected notification to the remote server 134 or the user device 136 when the connection signal CON_SIG is deactivated. The GSM module sends the sensor connected notification and the sensor disconnected notification by way of a short message service (SMS), a push notification, an electronic mail (Email), and the like.

In another embodiment, the communication module 132 is a Bluetooth module that is wirelessly connected to the user device 136. The user device 136 receives and displays the data corresponding to the data signal DATA_SIG and the real time location. Further, the user device 136 transmits the data signal DATA_SIG and the real time location to the remote server 134.

In one embodiment, the user device 136 is a mobile phone that includes a mobile application as a software application. In another embodiment, the user device 136 is a computer and a web application is the software application which is hosted on the remote server 134. The software application comprises executable instructions that directs the user device 136 to receive the real time location and the data signal DATA_SIG from the remote server 134, generate statistics including graphs, charts, or the like based on the data signal DATA_SIG, generate a cost estimate based on the data signal DATA_SIG, and display the real time location, the cost estimate, or date and time corresponding to the data signal DATA_SIG. Further, the user device 136 provides an interface to download previous records of data corresponding to the data signal DATA_SIG in the form of Portable Document Format (PDF) and Excel files. Furthermore, the user device 136 provides an interface to reset the fluid gauging system 100.

The fluid gauging system 100 further includes a display module 138 that is connected to the processor 126. The display module 138 displays the data corresponding to the data signal DATA_SIG, the real time location, or the cost estimate of the fluid that is passed through the flow measuring device 102. The display module 138 is a Liquid crystal display (LCD), a Light emitting diode (LED) display, or the like.

In an embodiment, the fluid gauging system 100 includes an emergency switch (not shown) that is connected to the processor 126. When a user activates the emergency switch, the processor 126 directs the communication module 132 to transmit an emergency signal to the remote server 134. The emergency signal indicates that the user requires maintenance service of the fluid gauging system 100 or assistance when the fluid gauging system 100 is malfunctioning, at the location provided by the GPS module 128.

The fluid gauging system 100 further includes a debugging module 140 that enables the user to identify an error during malfunctioning of the fluid gauging system 100. The debugging module 140 is connected to the processor 126 by way of a Universal Serial Bus (USB) port (not shown). The debugging module 140 includes a debugging processor 142 connected to an error display module 144. The error display module 144 is a Liquid crystal display (LCD), a Light emitting diode (LED) display, or the like. The debugging processor 142 receives the error signal ERR_SIG from the processor 126 and debugs the error signal ERR_SIG to identify the error in the fluid gauging system 100. The debugging processor 142 provides the debugged error signal ERR_SIG to the error display module 144 to display the error in the fluid gauging system 100.

In an embodiment, the fluid gauging system 100 includes a fluid quality sensor (not shown) that measures quality of fluid based on viscosity and density of the fluid and generates an electrical signal. The processor 126 processes the electrical signal and generates a fluid quality signal which is indicative of the quality of the fluid. The communication module 132 transmits the fluid quality signal to the remote server 134 or the user device 136.

In an embodiment, the fluid gauging system 100 includes a fluid type detection sensor (not shown) that detects the type of fluid based on a refractive index of the fluid. The processor 126 automatically calibrates the fluid gauging system 100 based on the type of fluid such that the fluid gauging system 100 measures the amount of fluid irrespective of its type. Thus, a single fluid gauging system 100 can be utilized to measure the amount of fluid irrespective of its type and without the manual calibration of the fluid gauging system 100.

In an embodiment, the fluid gauging system 100 includes indicator LEDs (not shown) that indicate malfunctioning of at least of the processor 126, the GPS module 128, and the communication module 132.

Figure 2A:
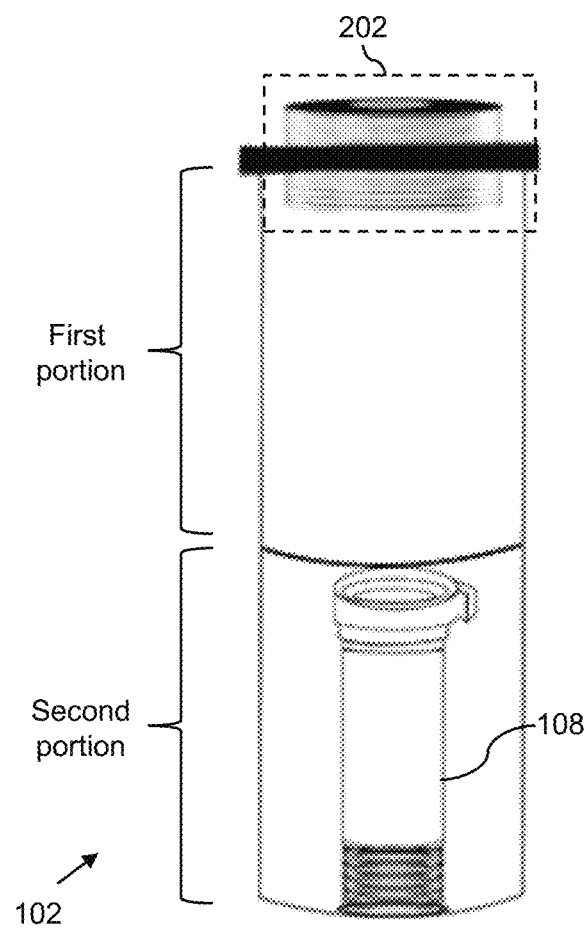
FIG. 2A is a flow measuring device with an air sealing arrangement implemented in the fluid gauging system of FIG. 1, in accordance with an embodiment of the present invention.

Referring now to FIG. 2A, the flow measuring device 102 with an air sealing arrangement 202, in accordance with an embodiment of the present invention is shown. In a presently preferred embodiment, the flow measuring device 102 is a cylindrical structure that is divided in to first and second portions. The first portion is a hollow portion which is connected to the second portion by way of a threaded coupling. The first portion has the inlet of the flow measuring device 102 on its first side and is provided with the air sealing arrangement 202. A second side of the first portion is connected to a first side of the second portion. A second side of the second portion has the outlet of the flow measuring device 102. The second portion includes the flow sensor 108 that is coupled to the outlet the flow measuring device 102.

Figure 2B:
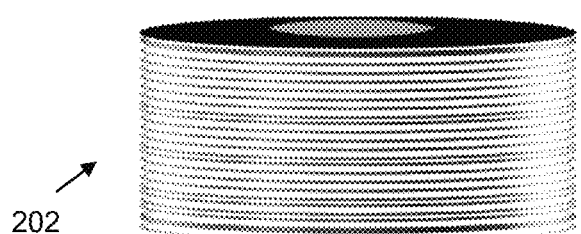
FIG. 2B is the air sealing arrangement of FIG. 2A, in accordance with an embodiment of the present invention.

Referring now to FIG. 2B, the air sealing arrangement 202, in accordance with an embodiment of the present invention is shown. In one embodiment, the air sealing arrangement 202 is formed using stack of 'O'-rings that are coupled to the inlet of the flow measuring device 102. In another embodiment, the air sealing arrangement 202 is formed using a single 'O'-ring that is coupled to the inlet of the flow measuring device 102. The 'O'-ring is made using plastic or rubber materials.

Figure 3:
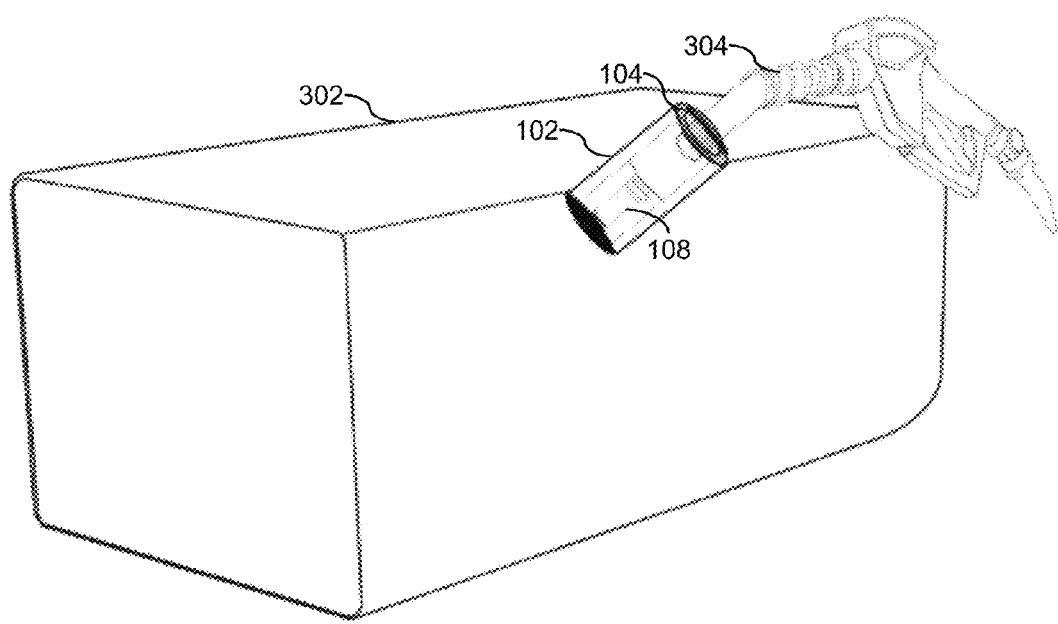
FIG. 3 is an implementation of the flow measuring device with the air sealing arrangement of FIG. 2A in vehicles, in accordance with an embodiment of the present invention.

Referring now to FIG. 3, an implementation of the flow measuring device 102 with the air sealing arrangement 104 in a vehicle (not shown), in accordance with an embodiment of the present invention. The flow measuring device 102 is coupled to a fuel tank 302 of the vehicle to measure an amount of a fuel dispensed by a fuel pump nozzle 304 of a fuel dispensing machine (not shown). In such application, the air sealing arrangement 104 is the 'O'-ring as described in the FIGS. 2A and 2B. The second portion of the flow measuring device 102 is coupled to an inlet of the fuel tank 302. The fuel pump nozzle 304 is inserted in the first portion of the flow measuring device 102 by way of the 'O'-ring. The 'O'-ring prevents leakage of the fuel and seals the inlet of the flow measuring device 102 against an entry of atmospheric air. Thus, the flow measuring device 102 accurately measures an amount of the fuel dispensed by the fuel pump nozzle 304. The flow measuring device 102 measures a flow rate of the fuel passing through it until the fuel pump nozzle 304 stops dispensing the fuel. The processor 126 calculates the amount of the fuel based on the flow rate of the fuel. Further, the processor 126 receives a real time location of the flow measuring device 102 from the GPS module 128. The communication module 132 transmits the amount of the fuel and the real time location to the remote server 134. The user device 136 receives and displays the amount of the fuel and the real time location using the software application. The amount of the fuel displayed by the fuel dispensing machine and the amount of the fuel measured by the flow measuring device 102 can be compared to detect tampering of the fuel dispensing machine.

Figure 4:
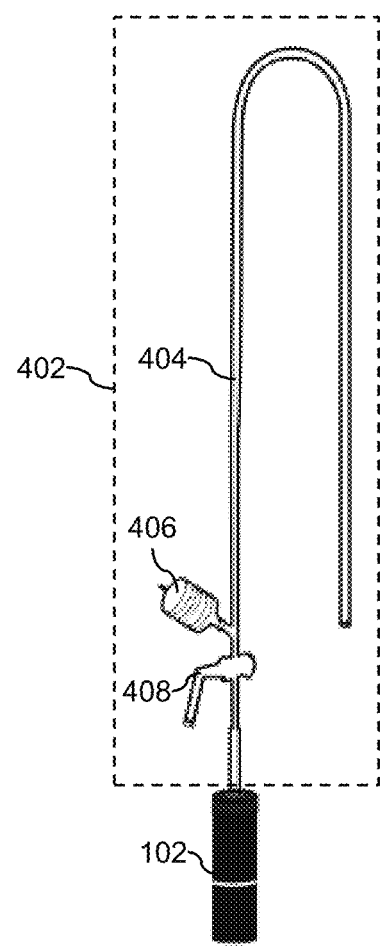
FIG. 4 is the flow measuring device with another air sealing arrangement implemented in the fluid gauging system of FIG. 1, in accordance with another embodiment of the present invention.

Referring now to FIG. 4, an implementation of the flow measuring device 102 with an air sealing arrangement 402, in accordance with another embodiment of the present invention is shown. The flow measuring device 102 of the FIG. 4 is structurally similar to the flow measuring device 102 of the FIG. 2A. The air sealing arrangement 402 is an automated air pump that includes an inlet pipe 404, an air suction arrangement 406, and a fluid regulation valve 408. The inlet pipe 404 has an input end to receive a fluid from a fluid source tank (not shown) and an output end that provides the fluid. The air suction arrangement 406 is at least one of rubber and plastic pumps, which receives and stores the fluid from the inlet pipe 404. The air suction arrangement 406 draws the fluid from the fluid source tank by creating vacuum inside the inlet pipe 404. The fluid regulation valve 408 is connected between the inlet of the flow measuring device 102 and the output end of the inlet pipe 404. The fluid regulation valve 408 controls the flow of the fluid passing through the flow measuring device 102.

Figure 5:
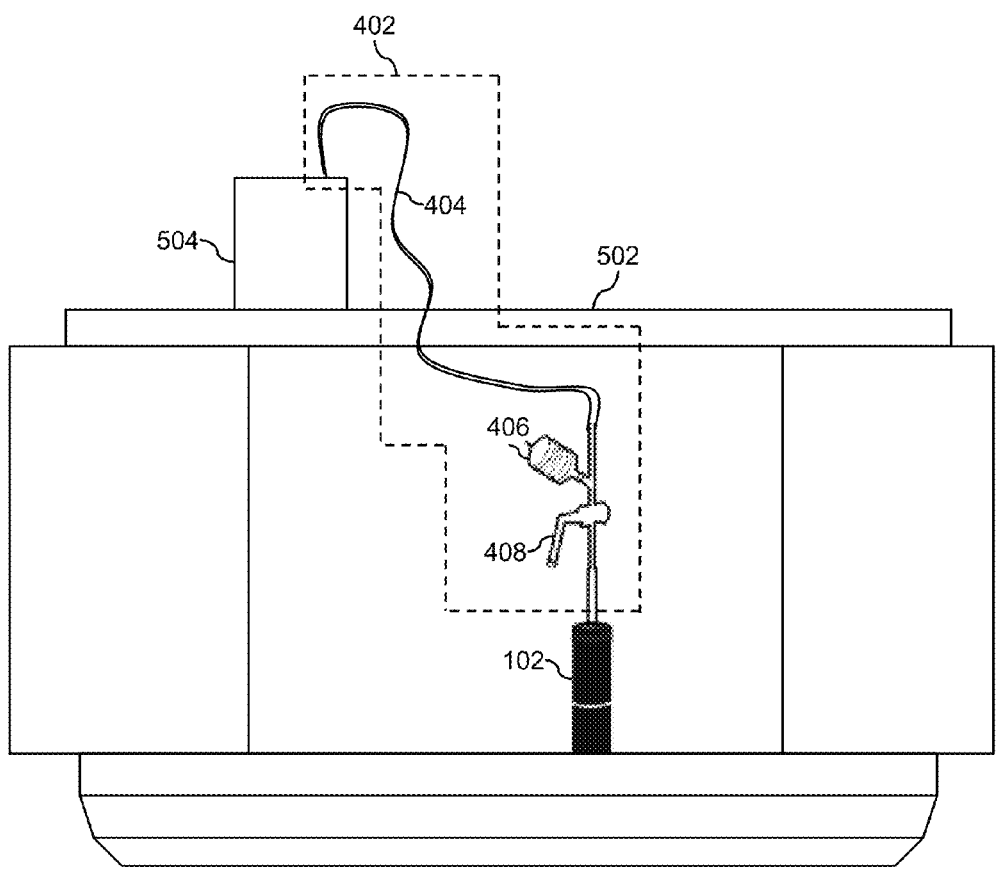
FIG. 5 is an implementation of the flow measuring device with the air sealing arrangement of FIG. 4 in a diesel generator application, in accordance with another embodiment of the present invention.

Referring now to FIG. 5, an implementation of the flow measuring device 102 with the air sealing arrangement 402 of FIG. 4 in diesel generators, in accordance with an embodiment of the present invention is shown. In such application, the outlet of the flow measuring device 102 is coupled to an inlet of a diesel generator 502. The inlet of the flow measuring device 102 is provided with the air sealing arrangement 402. The input end of the inlet pipe 404 is connected to a fuel source tank 504 that stores diesel. In presently preferred embodiment, the fuel source tank 504 is kept at a height greater than a height of the flow measuring device 102. An output end of the inlet pipe 404 is connected to the inlet of the flow measuring device 102. In one embodiment, the air suction arrangement 406 is manually operated by an attendant. In another embodiment, the air suction arrangement 406 is automated using an intermediate electronic circuit. The air suction arrangement 406 creates vacuum inside the inlet pipe 404 which draws diesel from the fuel source tank 504. The fluid regulation valve 408 is turned ON, thereby allowing passage of diesel from the fuel source tank 504 to the inlet of the flow measuring device 102 by way of the air suction arrangement 406. The flow measuring device 102 measures a flow rate of diesel flowing through it until the fluid regulation valve 408 is turned OFF.

The processor 126 generates the data signal DATA_SIG based on the flow rate of diesel. Since the fluid gauging system 100 provides diesel by way of the automated air pump, the fluid gauging system 100 accurately measures the flow rate of diesel irrespective of the height at which the fuel source tank 504 if kept above the ground. The data signal DATA_SIG corresponds to an amount and a cost estimate of diesel. Further, the processor 126 receives the real time location of the flow measuring device 102 from the GPS module 128. The communication module 132 transmits the data signal DATA_SIG and the real time location to the remote server 134. The user device 136 receives and displays the amount and cost estimate of diesel, and the real time location, using the software application.

In one embodiment, the fluid gauging system 100 receives a power signal from the diesel generator 502. The power signal is activated when the diesel generator 502 is turned ON and deactivated when the diesel generator 502 is turned OFF. Thus, a time difference between the turn ON and the turn OFF instances of the diesel generator 502 provides a time for which the diesel generator 502 was operated.

Figure 6:
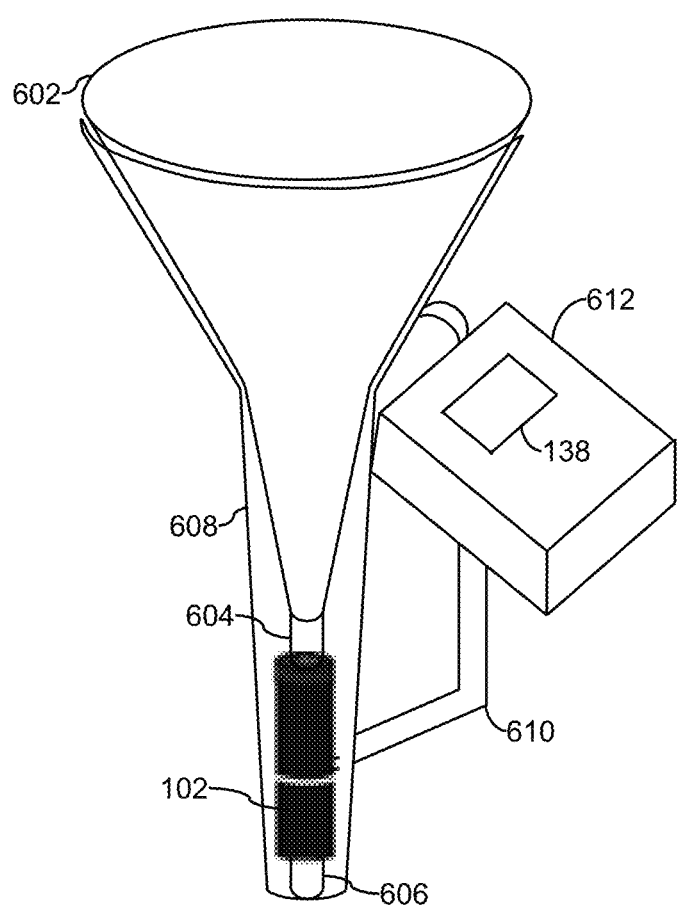
FIG. 6 is an implementation of the flow measuring device with a funnel, in accordance with yet another embodiment of the present invention.

Referring now to FIG. 6, an implementation of the flow measuring device 102, in accordance with yet another embodiment of the present invention is shown. A funnel 602 is attached to a first coupler 604 that couples the inlet of the flow measuring device 102 to the funnel 602. The outlet of the flow measuring device 102 is attached to a second coupler 606. The second coupler 606 is attached to a storage tank (not shown). In an embodiment, the first and second couplers 604 and 606 include 'O'-rings of FIG. 2B. The flow measuring device 102, the funnel 602, and the first and second couplers 604 and 606 are enclosed in an enclosure 608. The enclosure 608 is funnel-shaped with a handle 610. In one embodiment, an inner surface of the enclosure 608 is shaped to form the funnel 602 and the funnel 602 is eliminated. The electronic circuit 106 is enclosed in a case 612 which is fixed on the handle 610. The case 612 is made from plastic or metal materials and has an opening for the display module 138.

In operation, a fluid stored in a fluid storage tank (not shown) is poured through the funnel 602. The storage tank receives the fluid by way of the second coupler 606. The fluid passes through the flow measuring device 102 by way of the first coupler 604. The flow measuring device 102 measures a flow rate of the fluid flowing through it. The processor 126 generates the data signal DATA_SIG based on the flow rate of the fluid. The data signal DATA_SIG corresponds to an amount of the fluid or a cost estimate of the fluid. The display module 138 displays at least one of the amount of the fluid and the cost estimate of the fluid.

Figures 7A, 7B:
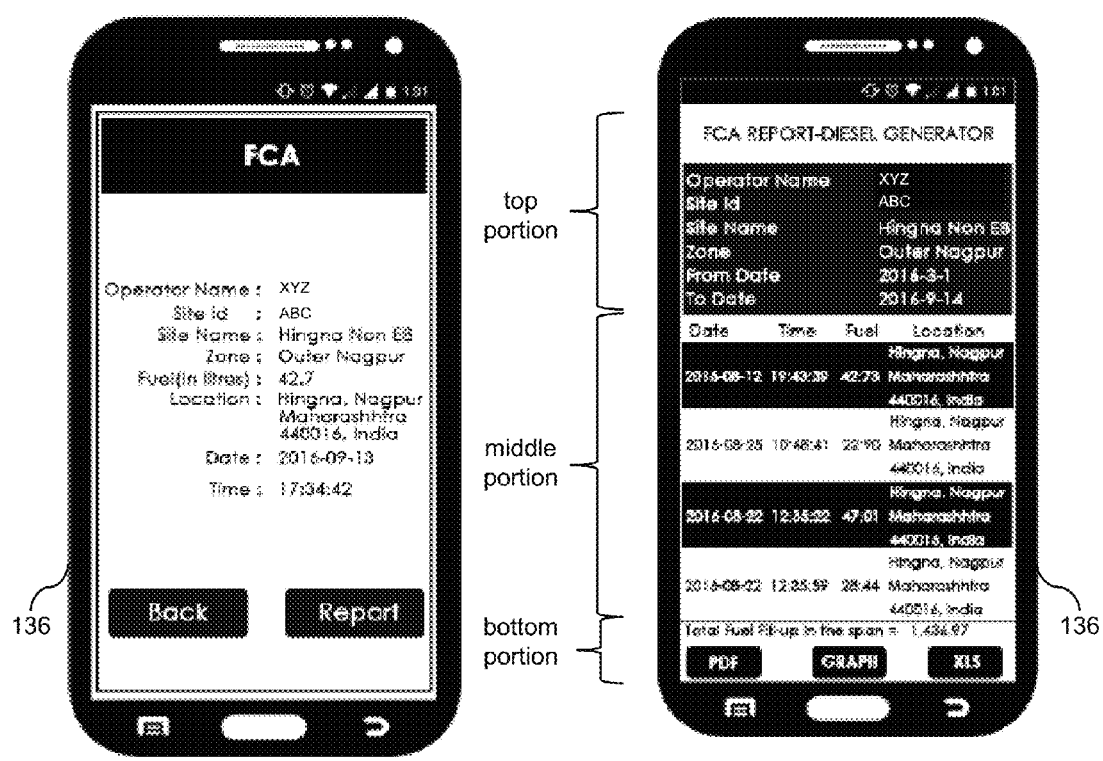
FIGS. 7A and 7B show screenshots illustrating a software application of the fluid gauging system of FIG. 1, in accordance with an embodiment of the present invention.

Referring now to FIG. 7A, a screenshot illustrating the software application on the user device 136, in accordance with an embodiment of the present invention is shown. The user device 136 is a mobile phone which includes a mobile application as a software application. The screenshot shows a name of a registered user, an address details, and a unique identification (ID). The address details include at least one of a site name, a zone, and a location. The address details correspond to the real time location established using the GPS module 128. Further, the software application of the user device 136 displays the amount of fluid measured by the flow measuring device 102 and a corresponding date and time. The address details, the amount of fluid, the real time location, the date and time shown in FIG. 7A are latest details provided by the remote server 134. Furthermore, the software application provides an interface to generate a report based on previous records of data corresponding to the data signal DATA_SIG stored on the remote server 134.

Referring now to FIG. 7B, a screenshot illustrating the report generated by the software application on the user device 136, in accordance with an embodiment of the present invention is shown. The screenshot shows the name of the registered user, a latest address details, and the unique identification (ID) at a top portion of the software application. A middle portion of the software application displays the previous records of data corresponding to the data signal DATA_SIG stored on the remote server 134. A bottom portion of the software application provides interfaces to generate the PDF, graphs, and Excel files based on previous records of the data. The web application in the computer is similar to the mobile application in the mobile phone.

The fluid gauging system 100 uses the air sealing arrangement 104 which enables an accurate measurement of the fluid by the flow sensor 108, irrespective of the type of fluid. The fluid gauging system 100 implements the air suction arrangement 406 with the diesel generator 502 to draw the fluid from the fuel source tank 504, thereby providing a safe option without causing any harm to the attendant. The air suction arrangement 406 allows accurate measurement of the flow rate of the diesel in diesel generator application irrespective of height at which the fuel source tank 504 is kept above the ground. Further, the fluid gauging system 100 notifies the remote server 134 and the user device 136 when the flow measuring device 102 is disconnected from the electronic circuit 106. Furthermore, the remote server 134 provides previous record of data corresponding to the data signal DATA_SIG along with corresponding real time locations which can be exported in the form of PDF and Excel files, thereby enabling a user to track usage of the fluid.

Figure 8:
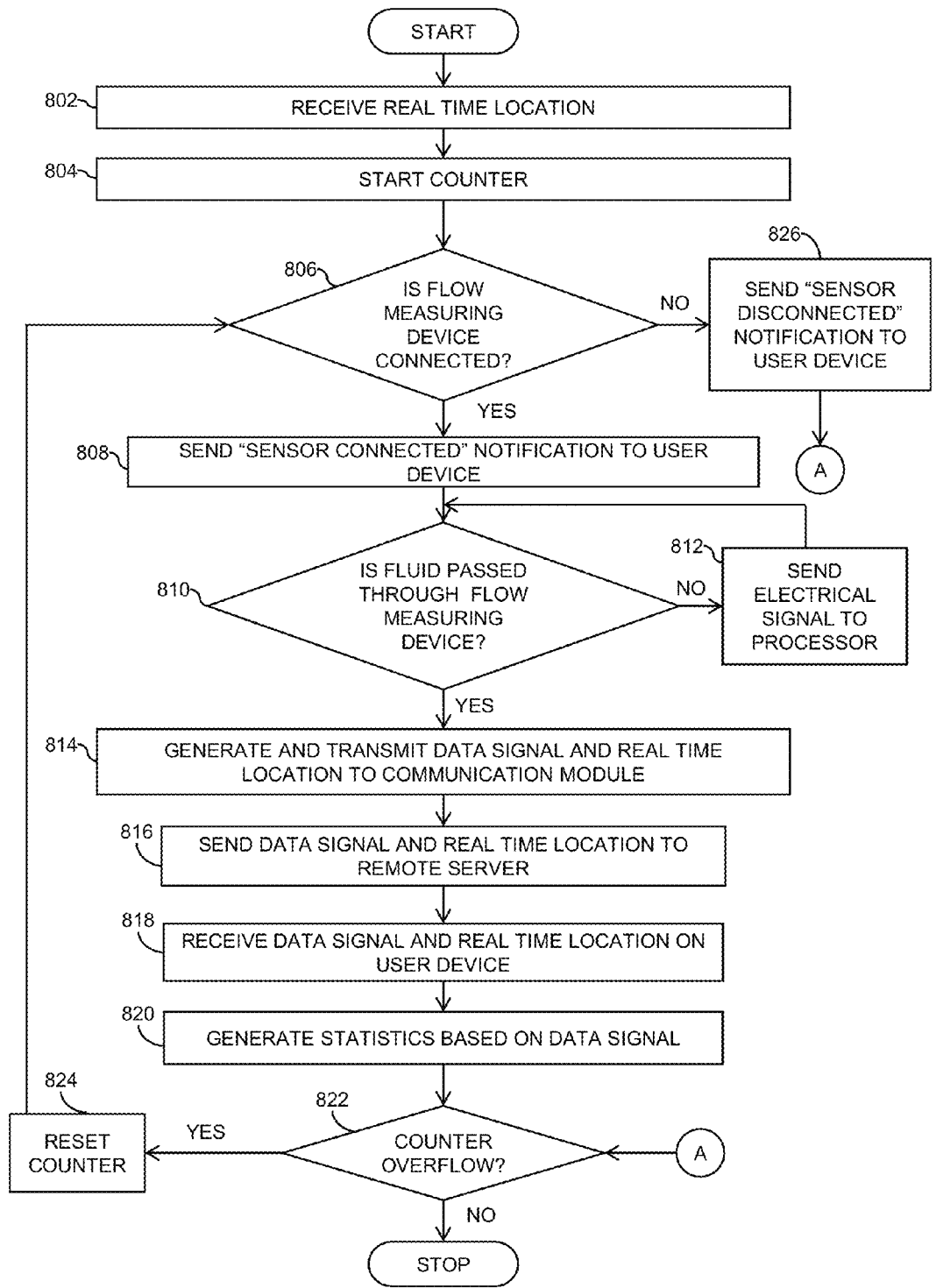
FIG. 8 is a flow chart illustrating a method for gauging a fluid by the fluid gauging system of FIG. 1, in accordance with an embodiment of the present invention.

Referring now to FIG. 8, a flow chart illustrating a method for gauging a fluid by the fluid gauging system 100, in accordance with an embodiment of the present invention is shown. At step 802, the GPS module 128 determines the real location of the flow measuring device 102. At step 804, the processor 126 starts a counter that corresponds to a predetermined time interval after which the processor 126 determines whether the flow measuring device 102 is connected to the electronic circuit 106. At step 806, the processor 126 determines whether the flow measuring device 102 is connected to the electronic circuit 106. If, at step 806, the processor 126 determines that the flow measuring device 102 is connected to the electronic circuit 106, the processor 126 executes step 808. At step 808, the communication module 132 transmits a sensor connected notification to the remote server 134. Further, the user device 136 receives the sensor connected notification from the communication module 132 by way of the remote server 134. At step 810, the processor 126 determines whether the amount of fluid to be measured by the fluid gauging system 100 is completely passed through the flow measuring device 102. If, at step 810, the processor 126 determines that the amount of fluid to be measured by the fluid gauging system 100 is not completely passed through the flow measuring device 102, the fluid gauging system 100 executes step 812. At step 812, the flow sensor 108 transmits the electrical signal EL_SIG to the processor 126 and executes step 810. If, at step 810, the processor 126 determines that the amount of fluid to be measured by the fluid gauging system 100 is completely passed through the flow measuring device 102, the fluid gauging system 100 executes step 814. At step 814, the processor 126 generates and transmits the data signal DATA_SIG to the communication module 132. At step 816, the communication module 132 transmits the data signal DATA_SIG and the real time location to the remote server 134. At step 818, the user device 136 receives the data signal DATA_SIG and the real time location from the remote server 134. At step 820, the user device 136, using the software application, generates statistics based on the data signal DATA_SIG. At step 822, the processor 126 determines whether a value of the counter is equal to the predetermined value. If, at step 822, the processor 126 determines that the value of the counter is equal to the predetermined value, the processor 126 resets the counter at step 824 and the fluid gauging system 100 executes step 806.

If, at step 806, the processor 126 determines that the flow measuring device 102 is disconnected from the electronic circuit 106, the processor 126 executes step 826. At step 826, the communication module 132 transmits a sensor disconnected notification to the remote server 134. Further, the user device 136 receives the sensor disconnected notification from the communication module 132 by way of the remote server 134, and the fluid gauging system 100 executes step 822.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A fluid gauging system, comprising:
   a flow measuring device that has an inlet that is coupled to a fluid source tank to receive a fluid, and an outlet that is coupled to a storage tank that stores the fluid, wherein the flow measuring device measures an amount of the fluid flowing through the flow measuring device, the flow measuring device comprising:
      a flow sensor that measures a flow rate of the fluid flowing through the flow measuring device, wherein the flow sensor generates an electrical signal that is proportional to the flow rate of the fluid;
   an air sealing arrangement, provided at the inlet of the flow measuring device to receive the fluid, wherein the air sealing arrangement seals the inlet of the flow measuring device against an entry of atmospheric air, thereby creating vacuum inside the flow measuring device; and
   an electronic circuit, comprising:
      a processor, connected to the flow sensor to receive the electrical signal, that processes the electrical signal and generates a data signal, wherein the data signal is indicative of the flow rate of the fluid;
      a memory, connected to the processor to store the data signal; and
      a communication module, connected to the processor, that receives the data signal and transmits the data signal to at least one of a remote server and a user device.

2. The fluid gauging system of claim 1, wherein the air sealing arrangement is an 'O'-ring.

3. The fluid gauging system of claim 1, wherein the air sealing arrangement is an automated air pump that comprises:
- an inlet pipe that has an input end connected to the fluid source tank to receive the fluid and an output end to provide the fluid;
- an air suction arrangement, connected to the output end of the inlet pipe to create vacuum in the inlet pipe, thereby drawing the fluid from the fluid source tank; and
- a fluid regulation valve, connected between the inlet of the flow measuring device and the output end of the inlet pipe, that controls a flow of the fluid through the flow measuring device, wherein when the fluid regulation valve is in an open position, the air suction arrangement provides the fluid to the inlet of the flow measuring device.

4. The fluid gauging system of claim 1, wherein the electronic circuit further includes a global positioning system (GPS) module that is connected to the processor to establish a real time location of the fluid gauging system, and wherein the GPS module is connected to the communication module to transmit the real time location to at least one of the remote server and the user device.

5. The fluid gauging system of claim 4, wherein the user device includes a software application, and wherein the software application comprises executable instructions that direct the user device to at least one of:
- receive the real time location and the data signal from at least one of the remote server and the communication module;
- generate statistics based on the data signal;
- generate a cost estimate based on the data signal; and
- display the real time location, the cost estimate, and date and time corresponding to the data signal.

6. The fluid gauging system of claim 4, wherein the communication module is a global system for mobile (GSM) module, that receives the data signal from the processor and the real time location from the GPS module and transmits the data signal and the real time location to at least one of the remote server and the user device.

7. The fluid gauging system of claim 4, wherein the communication module is a Bluetooth module that receives the data signal from the processor and transmits the data signal and the real time location to the user device, and wherein the user device transmits the data signal to the remote server.

8. The fluid gauging system of claim 1, wherein the flow sensor is a turbine flow sensor.

9. The fluid gauging system of claim 1, wherein the electronic circuit further comprises:
- first through fourth diodes, connected to form a bridge rectifier, that receives an input signal by way of a voltage supply and generates an output signal;
- a voltage regulator that has an input terminal connected to the bridge rectifier, wherein the voltage regulator regulates a voltage level of the output signal and generates and provides a power signal at an output terminal, and wherein the power signal powers the fluid gauging system;
- a filter capacitor that is connected between the output terminal of the voltage regulator and ground; and
- a light emitting diode (LED), connected between the output terminal of the voltage regulator by way of a resistor and ground, wherein an ON state of the LED is indicative of presence of the voltage supply in the fluid gauging system.

10. The fluid gauging system of claim 9, further comprising:
- a first power supply wire, connected between the output terminal of the voltage regulator and a first terminal of a first port, that receives the power signal and provides the power signal to the first terminal of the first port;
- a second power supply wire, connected between the flow sensor and a first terminal of a second port, wherein the second power supply wire provides the power signal as a first intermediate power signal to the flow sensor when the first terminal of the first port is connected to the first terminal of the second port, whereby powering the flow sensor;
- a first live wire, connected between the second power supply wire and a second terminal of the second port, that receives the first intermediate power signal and provides the first intermediate power signal to the second terminal of the second port; and
- a second live wire, connected between the processor and a second terminal of the first port, that receives the first intermediate power signal as a second intermediate power signal and provides the second intermediate power signal to the processor, wherein the processor activates a connection signal when the second intermediate power signal is at a first logic state, and wherein the first logic state is indicative of an electrical connection between the flow measuring device and the electronic circuit, and wherein the communication module transmits a sensor connected notification to at least one of the user device and the remote server.

11. The fluid gauging system of claim 10, wherein the processor deactivates the connection signal when the second intermediate power signal is at a second logic state, and wherein the communication module transmits a sensor disconnected notification to at least one of the user device and the remote server when the second intermediate power signal is at the second logic state.

12. The fluid gauging system of claim 1, further comprising:
- a debugging processor, connected to the processor, that receives and debugs an error signal, wherein the error signal is indicative of an error in the fluid gauging system; and
- an error display module, connected to the debugging processor, that displays the error in the fluid gauging system.

13. A method for gauging a fluid, wherein the method assists a user to measure an amount of the fluid transferred from a fluid source tank in to a storage tank based on a flow rate of the fluid, and wherein the method assists transfer of data corresponding to the amount of the fluid to at least one of a user device and a remote server, comprising:
- determining a location of a flow measuring device by a global positioning system (GPS) module;
- determining whether the flow measuring device is connected to a processor and a power supply based on a logic state of a live signal through a live wire;
- transmitting a sensor connected notification to at least one of the user device and the remote server using a communication module when the logic state of the live signal is indicative of an electrical connection between the flow measuring device, the processor, and the power supply;

receiving the fluid at an inlet of the flow measuring device from the fluid source tank;

generating an electrical signal by the flow measuring device, wherein the electrical signal is proportional to the flow rate of the fluid;

processing the electrical signal by the processor;

generating a data signal by the processor based on the processed electrical signal, wherein the data signal is indicative of the flow rate of the fluid;

transmitting the data signal and the location of the flow measuring device to at least one of the remote server and the user device by the communication module; and generating statistics based on the data signal.

14. The method for gauging a fluid of claim 13, further comprising:

determining whether the logic state of the live signal is indicative of an electrical disconnection between the flow measuring device, the processor, and the power supply;

providing a sensor disconnected notification to at least one of the user device and the remote server using the communication module; and determining the logic state of the live wire after a predetermined time interval.

* * * * *